(12) United States Patent
Giffin et al.

(10) Patent No.: US 7,783,734 B2
(45) Date of Patent: Aug. 24, 2010

(54) SATELLITE COMMUNICATIONS SYSTEM FOR PROVIDING GLOBAL, HIGH QUALITY MOVEMENT OF VERY LARGE DATA FILES

(75) Inventors: Gregory Giffin, Vancouver (CA); Logan Duffield, Halifax (CA); Joseph Bravman, Potomac, MD (US); Mark Wlodyka, Coquitlam (CA); Kjell Magnussen, Richmond (CA)

(73) Assignee: MacDonald, Dettwiler and Associates Ltd., Richmond (CA)

( * ) Notice: Subject to any disclaimer, the term of this patent is extended or adjusted under 35 U.S.C. 154(b) by 1448 days.

(21) Appl. No.: 10/530,018

(22) PCT Filed: May 14, 2004

(86) PCT No.: PCT/US2004/015154

§ 371 (c)(1),
(2), (4) Date: Apr. 1, 2005

(87) PCT Pub. No.: WO2004/107185

PCT Pub. Date: Dec. 9, 2004

(65) Prior Publication Data

US 2006/0155840 A1    Jul. 13, 2006

Related U.S. Application Data

(60) Provisional application No. 60/473,744, filed on May 27, 2003.

(51) Int. Cl.
*G06F 13/00* (2006.01)
(52) U.S. Cl. .................. 709/223; 709/219; 709/237; 709/238
(58) Field of Classification Search .................. 709/217, 709/219, 223, 238, 249, 250
See application file for complete search history.

(56) References Cited

U.S. PATENT DOCUMENTS

| 3,714,377 A | 1/1973 | Moretti |
| 5,521,631 A | 5/1996 | Budow et al. |
| 5,600,629 A | 2/1997 | Van Daele et al. |
| 5,634,190 A | 5/1997 | Wiedeman |
| 5,678,175 A | 10/1997 | Stuart et al. |

(Continued)

FOREIGN PATENT DOCUMENTS

EP    1063603 A2    12/2000

(Continued)

*Primary Examiner*—Viet Vu
(74) *Attorney, Agent, or Firm*—Perkins Coie LLP

(57) ABSTRACT

A system for providing communication services between geographically disbursed source and destination terminals includes at least one airborne or spaceborne wireless communication device, such as a satellite. The wireless communication device is configured to store and forward large data files of at least an aggregated 10 gigabytes. The wireless communication device includes a wireless transceiver for communicating with the source and destination terminals over at least one high bandwidth channel. A mass data storage device stores the large data files for a predetermined period of time that is greater than approximately two minutes. At least one processor is coupled among the mass data storage and wireless transceiver. The processor is configured to control receipt of a large data file from the source terminal and to transmit it to the destination terminal as the wireless communication device nears the destination terminal.

18 Claims, 6 Drawing Sheets

U.S. PATENT DOCUMENTS

| | | | |
|---|---|---|---|
| 5,777,988 | A | 7/1998 | Cisneros |
| 5,884,142 | A | 3/1999 | Wiedeman et al. |
| 5,896,402 | A | 4/1999 | Kurobe et al. |
| 5,915,217 | A | 6/1999 | Wiedeman et al. |
| 5,918,157 | A | 6/1999 | Wiedeman et al. |
| 6,018,516 | A | 1/2000 | Packer |
| 6,088,571 | A | 7/2000 | Kane et al. |
| 6,157,621 | A | 12/2000 | Brown et al. |
| 6,208,626 | B1 | 3/2001 | Brewer |
| 6,377,608 | B1 | 4/2002 | Zyren |
| 6,400,724 | B1 | 6/2002 | Yao |
| 6,408,007 | B1 | 6/2002 | Park |
| 6,411,607 | B1 | 6/2002 | Robert, III et al. |
| 6,584,082 | B1 | 6/2003 | Willis et al. |
| 6,601,208 | B2 | 7/2003 | Wu |
| 6,618,357 | B1 | 9/2003 | Geyer et al. |
| 6,618,391 | B1 | 9/2003 | Chiussi et al. |
| 6,643,273 | B2 | 11/2003 | Chao |
| 6,654,344 | B1 | 11/2003 | Toporek et al. |
| 2002/0089927 | A1 | 7/2002 | Fischer et al. |
| 2002/0097733 | A1 | 7/2002 | Yamamoto |
| 2002/0114342 | A1 | 8/2002 | Yao |
| 2003/0058876 | A1 | 3/2003 | Connor et al. |
| 2003/0079022 | A1 | 4/2003 | Toporek et al. |
| 2003/0123394 | A1 | 7/2003 | Neale et al. |
| 2004/0008716 | A1 | 1/2004 | Stiliadis |
| 2004/0211864 | A1 * | 10/2004 | Less et al. ............. 244/158 R |

FOREIGN PATENT DOCUMENTS

| | | |
|---|---|---|
| GB | 2307144 A | 5/1997 |
| WO | WO00/51009 A1 | 8/2000 |
| WO | WO01/41400 A1 | 6/2001 |

* cited by examiner

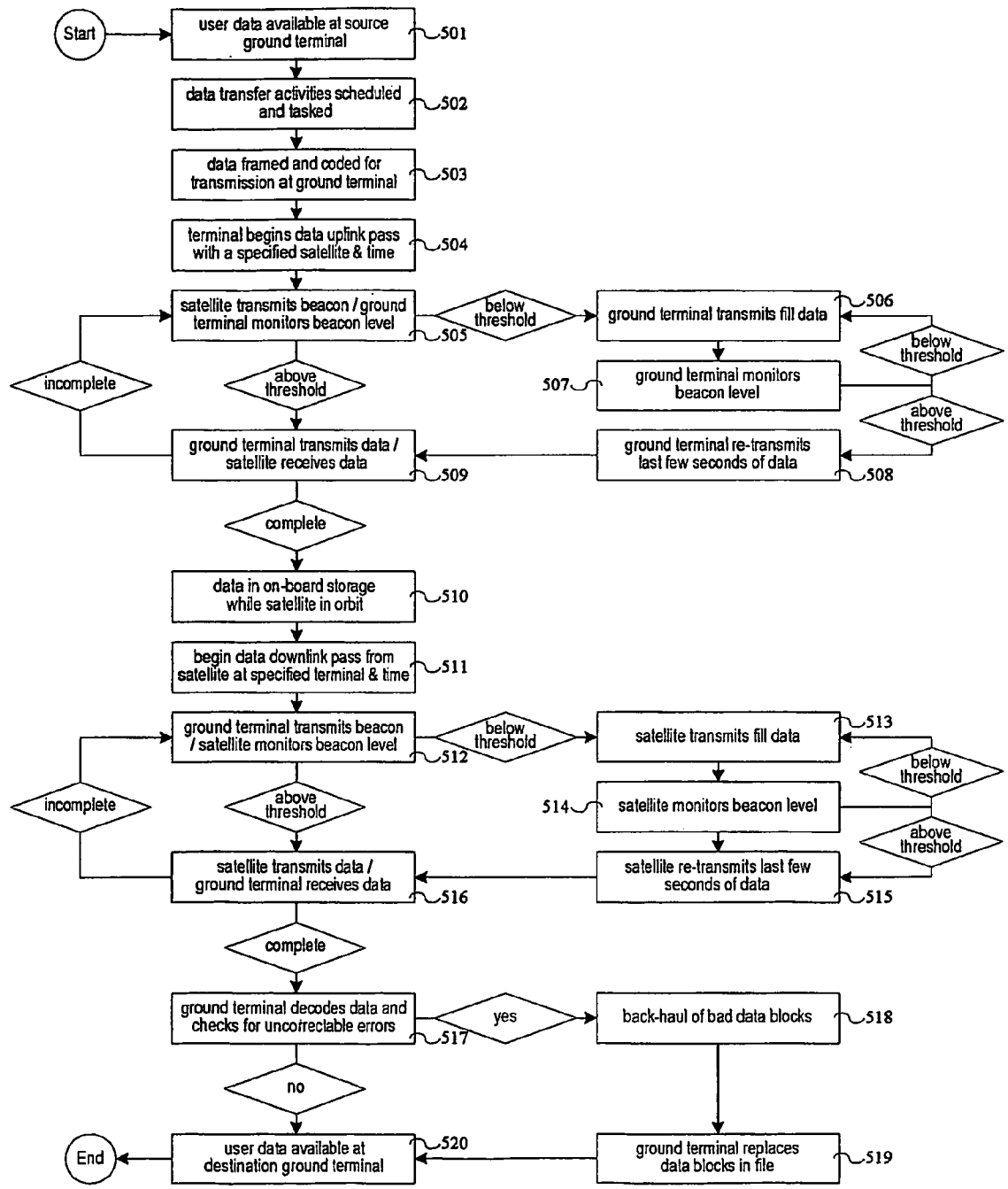
Figure 5 : End-to-end data flow method diagram.

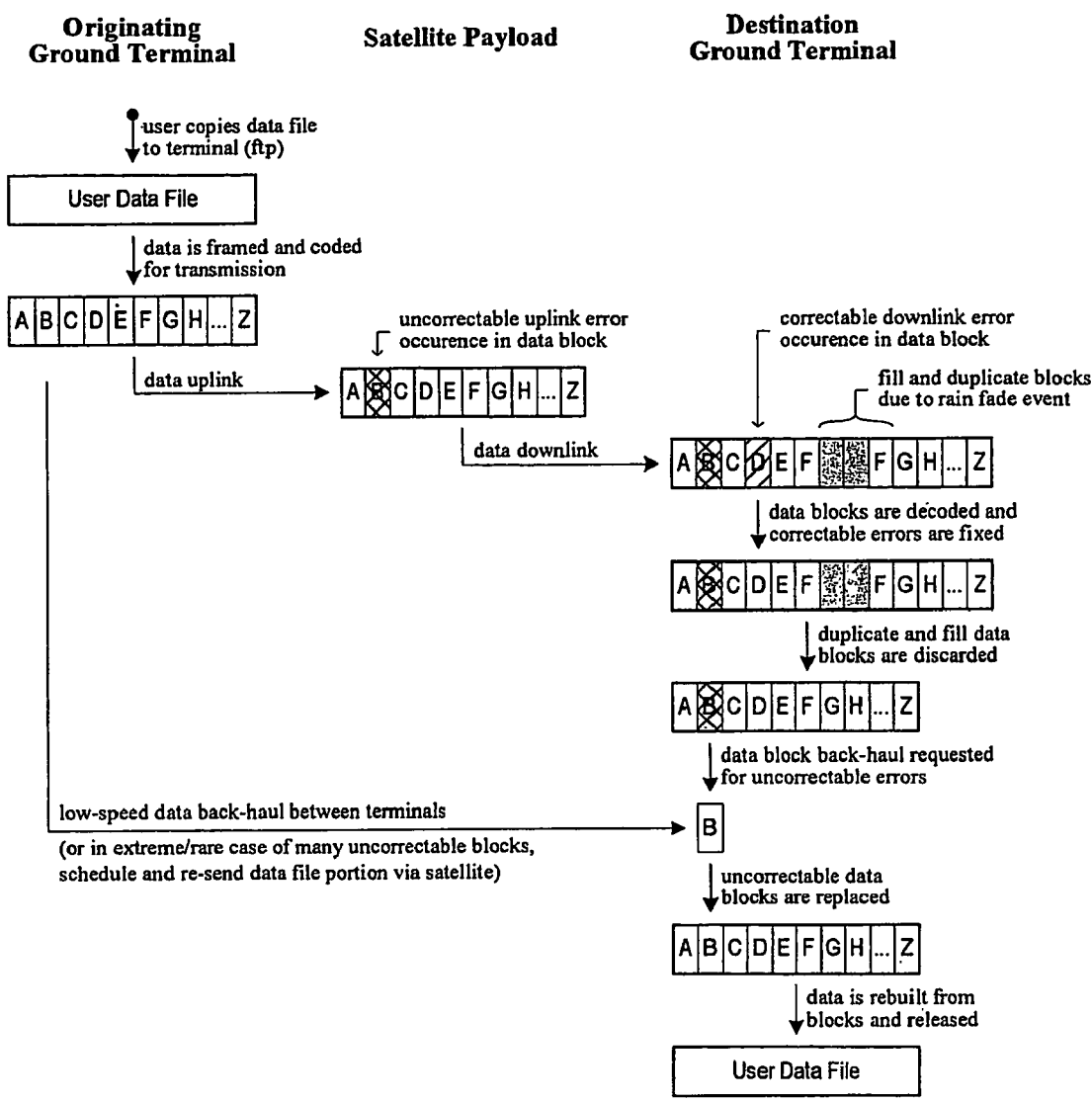
Figure 6 : Data error correction method diagram.

SATELLITE COMMUNICATIONS SYSTEM FOR PROVIDING GLOBAL, HIGH QUALITY MOVEMENT OF VERY LARGE DATA FILES

CROSS-REFERENCE TO RELATED APPLICATION(S)

This application is a U.S. National Phase application of PCT/US2004/015154, filed 14 May 2004, which claims the benefit of U.S. Provisional Patent Application No. 60/473,744, filed May 27, 2003, both of which are incorporated herein by reference.

BACKGROUND

Currently excellent digital data transfer services are available in well connected areas where fibre-optic networks and new terrestrial wireless technologies permit the movement of very large volumes of data at very high speeds. However this level of sufficient telecommunications infrastructure is primarily limited to densely populated areas of the world.

Existing geostationary earth orbit (GEO) satellites do provide relatively high data volume transfer services but are inherently limited to specific regions, with coverage typically over or near land only. Most of these also provide much lower data rates as their goal is to service large numbers of users each demanding a relatively smaller capacity. There are very few wideband transponders as most are limited to about 72 MHz, and even these would require a large antenna to operate at the necessarily high data rates to transfer massive volumes of data.

Although timeliness of delivery for small (i.e. up to tens of megabytes) data files is generally fast, the same is not true for larger data files with such transponder bandwidth or antenna size limitations. In addition this method places costly equipment requirements on the user, and transponder capacity required for very large data files is typically not available on a consistent, long-term basis. Furthermore the time required to transfer such large files at these bandwidths requires a long and uninterrupted connection making such methods especially impractical for shipboard or mobile use. Moreover, many of such existing systems induce errors in the act of transmitting the data, which at times can amount to substantial losses of data in such a large data transfer.

Even the data volumes supported by new internet satellites is generally low, as they are designed for asymmetric internet-type usage with slow transmit rates and high receive rates. As such, internet satellites cannot support the data rates required to transfer large data files in a timely manner. Additionally, as above, many of these satellites are GEO satellites dedicated to large regional markets and subjected to certain regulations and/or technical hurdles.

In many cases the transfer of large data files is accomplished through the courier of physical media. Ignoring loss of transmitted packages, such couriers achieve a much greater rate of delivering relatively error-free data over the wireless transmission methods noted above. Further, such couriers can be considered more secure than wireless broadcast methods. However, access to conventional courier service generally does not extend to remote areas, particularly in a timely manner, and shipments are susceptible to large delays, such as processing through customs. The courier method for bulk data transfer tends to be labour intensive and shuttling of physical media by helicopter from ocean going vessels, while near shore, is extremely costly and not practical farther off shore.

Many data sources and sinks located in remote areas do not, as of yet, have access to sufficient, or cost effective, services for the bulk transfer of data. Users in remote locations, with no viable options for transferal of large volumes of data, where complex computations or analyses are required are often forced to maintain significant de-centralized infrastructure and personnel to process the data on-site, which is operationally expensive when such options are even available.

BRIEF DESCRIPTION OF THE DRAWINGS

FIG. 5: A diagram of the end-to-end data flow method used by the system for providing service.

FIG. 6: A diagram illustrating techniques within the data error correction method.

DETAILED DESCRIPTION

Aspects of the invention described herein are directed to a method and system to implement a digital transport service for very large data files, currently up to hundreds of gigabytes, with global point-to-point coverage for non-real-time applications, with virtually error-free delivery in less than a day. This method and system is scalable as technology makes advances in parallel with growing needs of the markets that are served. This system makes it possible to service a user need, for the timely movement of very large volumes of data from remote areas, that are not well served by existing or projected offerings such as existing geostationary satellites, broadband terrestrial wireless or fibre networks.

One embodiment of the invention, that addresses the above service market niche, is a store-and-forward fleet of small low earth orbit (LEO) communication satellites as elements of a system capable of providing bulk transfer services for large digital data files from small sized remote ground terminals, on land or over water. This embodiment, based on a small-satellite platform, focuses on such a file transfer (i.e. unlike complex multi-service communication satellites that support real-time and/or on-demand functionality) and therefore permits use of several innovative method features that give rise to a simple and cost-effective system. The same embodiment can be adapted to also provide ultra-high bandwidth near real time transfers. This would occur when both the source and destination terminals (or a relay terminal) were simultaneously in sight of the satellite. The data would be transferred from one to the other without the requirement for storage and subsequent transmission. Alternatively, intersatellite links may be employed to establish a near real-time path.

The following description of the invention provides a thorough understanding of, and enabling description for, the embodiment of the invention. Some ancillary elements are included in the description of the invention, for reference and context. However, one skilled in the art will understand that the invention may be practiced without many of these details. In other cases, well-known system components and functions have not been shown or described in order to avoid unnecessarily obscuring the description of the embodiment of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
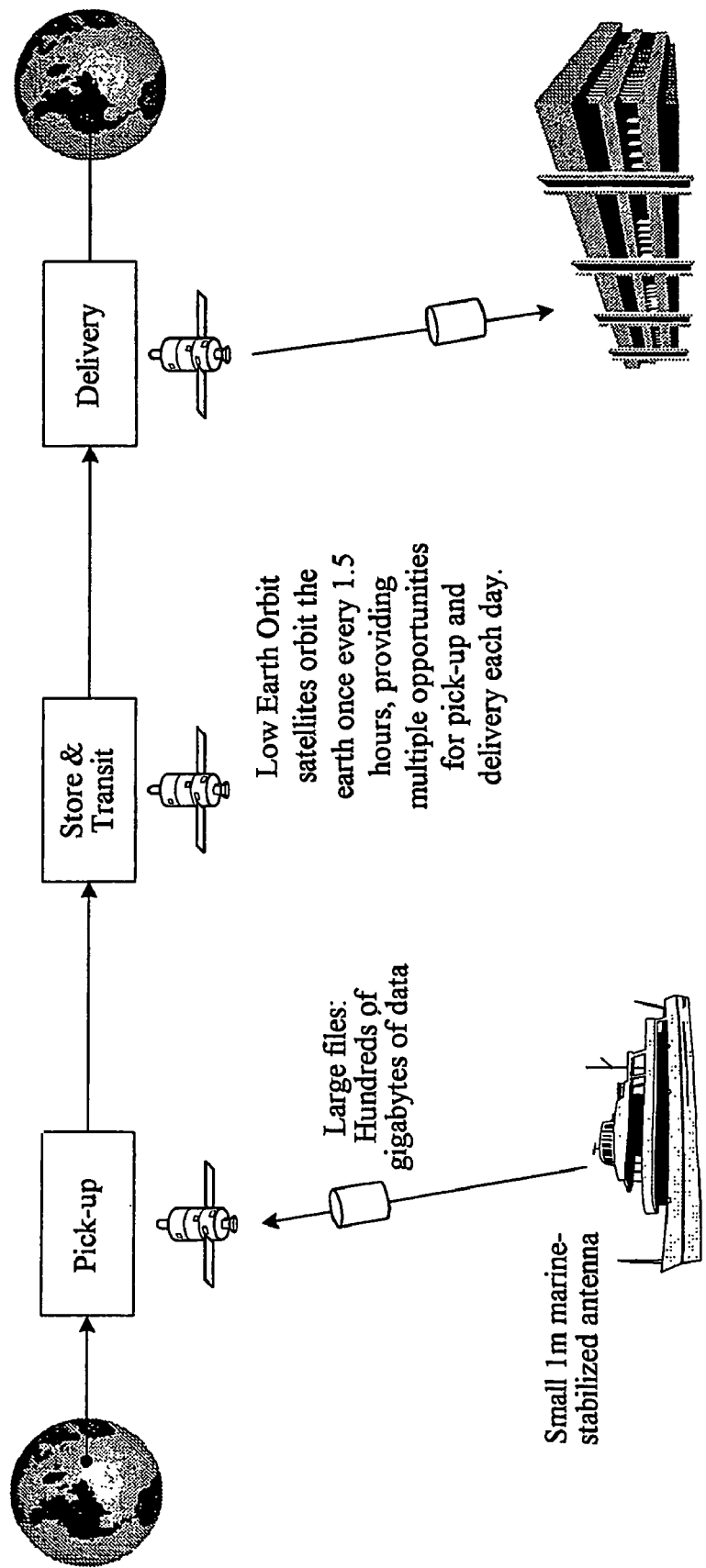
FIG. 1: A high level illustration of the service, in the context of a specific embodiment (seismic survey service example).
Figure 2:
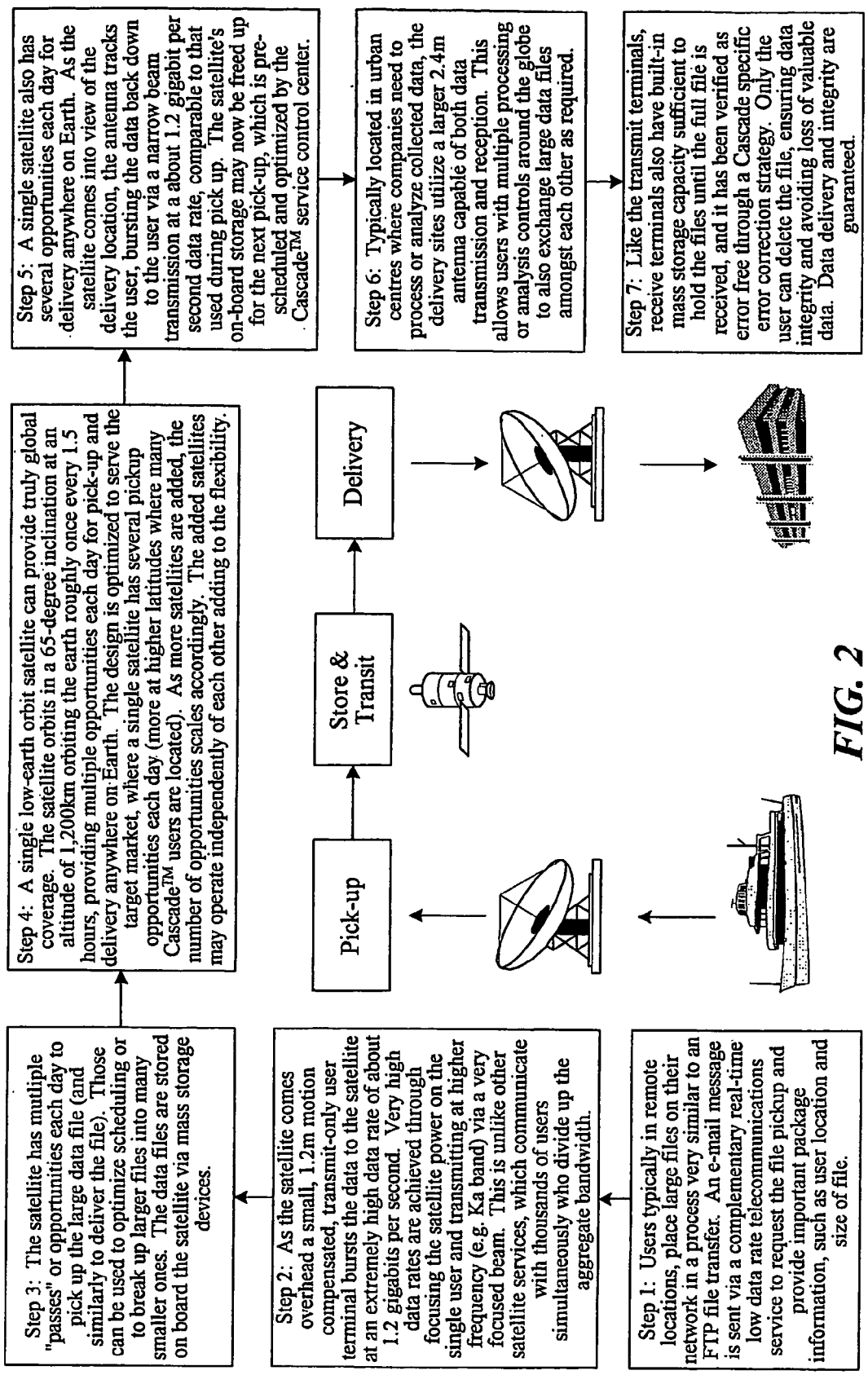
FIG. 2: A high level illustration of the service, in the context of a specific embodiment.

At a high level, as shown in FIG. 1, the depicted embodiment of the invention is a satellite communication system for the pick-up, storage in transit, and drop-off (delivery) of large digital data files for non-real-time applications. This embodiment provides global coverage, with extremely high data fidelity, and data delivery times of less than a day. FIG. 2 shows the high level operational concept of a specific embodiment example, in particular a system (referred to in the diagram as "CASCADE™") that provides an "express delivery service" for large data files. It is noted that other embodiment permutations of this example are also feasible to implement the same or similar system and methods. The invention has a number of innovative aspects, distinct from other typical satellite communications systems, that are applicable in other fields. For convenience some features of the system and method are summarized below.

Unless described otherwise herein, the blocks depicted in FIGS. 1 and 2 and the other Figures are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art.

1. Error-free data transfer. Through the use of pre-processing and post-processing techniques, made possible by the non-real-time focus of the system, the probability of the system flipping just a single bit in user data is less than $\sim 10^{-16}$. This level of end-to-end data quality is equivalent to the occurrence of only one bad bit during the delivery of more than 10,000 files where each of about 100 gigabytes. These techniques employ the cessation of data flow when the channel degrades and feature multiple means to only replace relatively small erroneous data blocks via a low bandwidth auxiliary channel. The receiving station notifies the sender to request these data blocks that must be resent.

2. Immune to poor channel events. Channel quality is ensured through a control loop based on the monitoring of channel conditions using beacon strength measurements. Data transmission is simply ceased for the infrequent periods when beacon strength falls below an acceptable threshold level (e.g., rain fade events). Since the system is non-real-time and non-continuous, occasional rain fade events have no material effect on the service. For this reason the availability of the raw channel can be much less that that of real-time systems, greatly reducing the size, cost and power of both the space and ground equipment needed to provide the service.

Furthermore the existence of this beacon signal also offers the system an ability to adjust power level, bandwidth, or even closed-loop track the satellite's position to improve antenna pointing accuracy. The ability to control power levels is especially valuable in conserving battery power on the satellite. The satellite's ability to service a larger number of customer transfers is a function of orbit parameters, but also is limited by an orbit average power budget. In one embodiment described below, the overall bandwidth capacity is achieved by multiplexing a number (e.g., four) channels. Should link quality degrade an optional feature would allow all transmit power to be allocated to less channels, thus maintaining a quality link, but at a reduced bandwidth until fade conditions improve.

3. Interference friendly. Since all actions of the system are performed on a pre-determined basis and since the applications are all non-real-time, the system can easily avoid transmitting along pre-designated vectors such as the geostationary arc or ones that would intersect other low earth orbit systems, which would otherwise create signal interference.

4. No data transfer protocol required. Since the system only supports non-real-time applications, it avoids the usual satellite communications need for a data transfer protocol and the associated return channel. This means that the primary communications channel can be utilized at 100% of designed capacity.

5. No complex multiple user access scheme required. The system services users sequentially and allocates the full satellite capacity to only one single user at given a time. Therefore, there is no multiple user access scheme employed by the system. This also allows for simple, and cost effective, very high data rate channelization of the bandwidth versus tens or hundreds of individual lower rate channels more typically used by satellite communications systems.

6. No signal latency issues. The system depicted herein, through its focus on file transfers, principally supports non-real-time applications. Therefore signal latency issues usually found with satellite communications systems that try to support real-time applications such as phone conversations are not applicable.

7. No complex 'on-demand' satellite resource allocation required. All actions by the system are pre-determined on the ground. The satellite control facility only has to periodically uplink the scheduled actions and then each satellite executes them as specified. Therefore, the satellite does not have to make an autonomous decision about which customers to serve, or when to serve them, significantly simplifying its design. An optional feature would add a low bandwidth link to the satellite that would allow a user to request data file pick-ups on a non-priority basis. As implemented, the serial servicing of users under this alternative embodiment may remain, and the decision to accept a new pickup must only insure that this new action does not violate on-board storage limits, violate previously scheduled deliveries, violate the current orbit's power budget, or other criteria.

8. No significant connectivity with terrestrial networks needed. Many satellite communications systems depend on connectivity with terrestrial communications infrastructure to complete their service. This system operates essentially independent of terrestrial communications infrastructure, moving data directly from the data source to the specified data sink, although the terminus could be a fibre node when desired.

9. Incremental system growth. Each satellite may operate independent of every other satellite in this system and the system users do not need to be in continuous view of a satellite to be satisfied. Therefore, a large fleet of satellites is not needed to begin the service. The service can begin with a limited number of satellites (e.g., one satellite), with additional satellites deployed if or when demands warrant. This is in contrast to many other satellite communications systems (especially those that utilize non-geostationary orbits (NGSO)) where a large number of satellites have to be completed and on orbit before any users can be supported.

10. All techniques that are described scale with available technology elements. For example, optical satellite communications can be substituted for radio frequency communications. Also as payload equipment becomes available to support higher bandwidth newer satellites and corresponding ground stations can be used to expand the service data rate capability.

11. The non real-time nature of the embodiment also allows terminals to be constructed at lower cost. Lower orbits permit the use of smaller antennas which are easier to point, and when only one way transfers are required the terminal may be receive or transmit only. Also the antennas may be pointed using a simplified open loop tracking embodiment in which the antenna pointing is based on a geometric calculation that uses the location and orientation of the terminal (as determined for example, by GPS and a compass) and the location of the satellite (as determined by time from GPS and current ephemeris and orbital elements).

As described below, a digital satellite communications system and data transfer method for the global movement of very large digital data files, ensures high data integrity, with delivery in less than a day. The system can handle very large data files, ranging currently from 50 to 500 gigabytes and the extremely high data quality achieved, with bit error rates on the order of $10^{-16}$, which is approximately equivalent to one bit error per 10,000 delivered files of 100 gigabytes.

A. SYSTEM ELEMENTS OF EMBODIMENT

Figure 3:
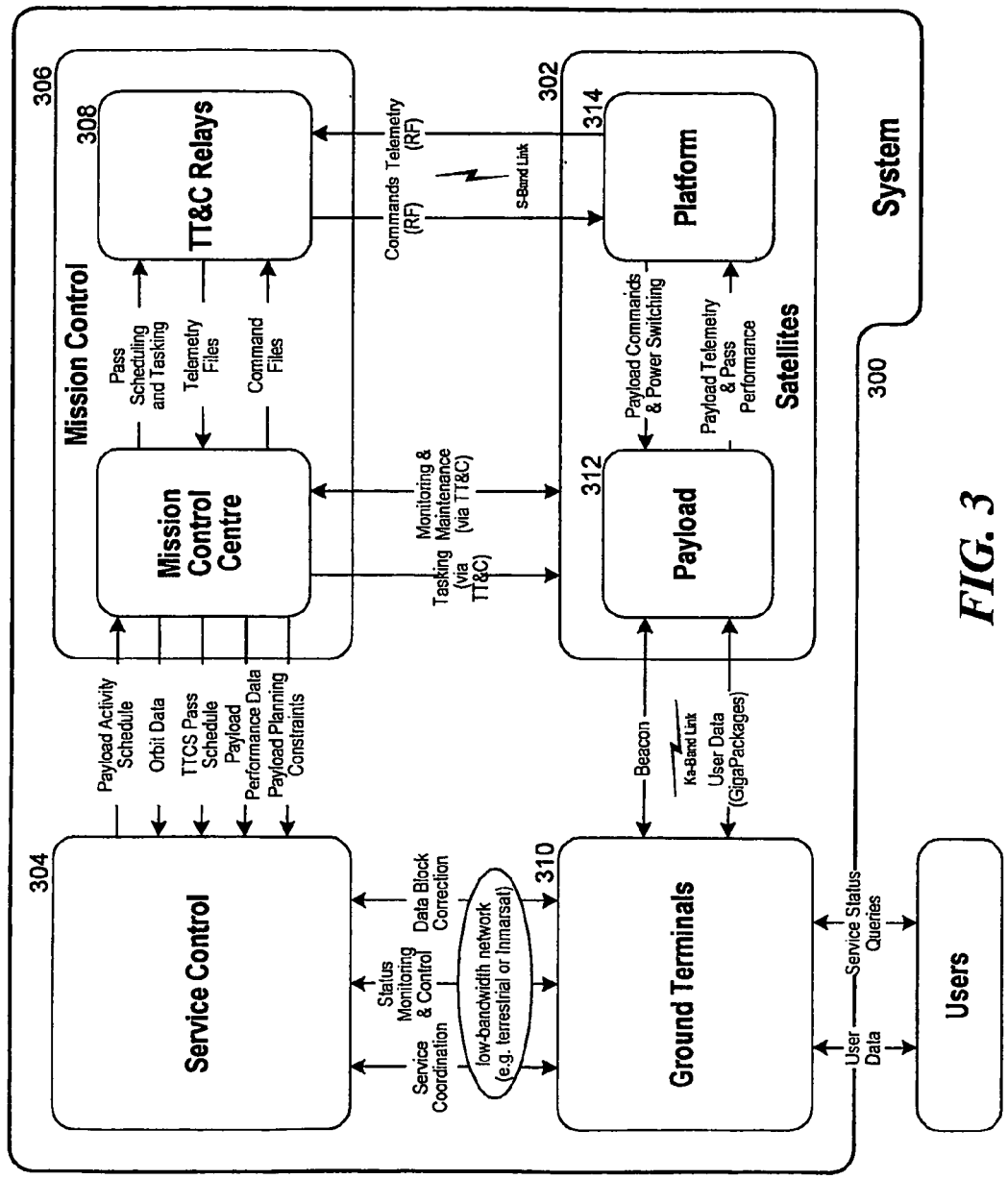
FIG. 3: A diagram identifying high level elements in the system architecture for an embodiment of the invention.

As shown in FIG. 3, an embodiment of this invention is a system 300 which includes a fleet of satellites 302 (with a communications payload and supporting platform), a centralized planning function (referred to as Service Control 304), a centralized satellite control and tasking function (referred to as Mission Control 306) with a set of telemetry, tracking and command (TT&C) relays 308, and a number of ground terminals 310 as architectural elements.

1. Satellite Fleet

The depicted embodiment of the invention in FIG. 3 includes a fleet of low earth orbiting (LEO) satellites 302. The satellites in the fleet are composed of a communications payload and a supporting platform. Each satellite in the fleet has an assigned orbit, with the orbit inclination of the satellites ranging from 60 to 70 degrees. This orbital configuration of the fleet is chosen to meet the required global access. It is noted that a regimented orbital configuration is not necessary. Other embodiments may place the satellites into an orbital configuration with variations on orbit altitude and inclination, which would also provide significant global coverage, or be optimized around the distribution of customer groups. The overall configuration of the fleet may be that of a single fleet or subdivided to better meet groups of user's requirements including global locations.

Within the embodiment each satellite 302 operates independent of every other satellite in the fleet. Each satellite has its own on-board mass data storage, with no requirement for inter-satellite links or overlapping coverage. As well, the system users do not need to be in continuous view of a satellite to be satisfied. Therefore, a large fleet of satellites is not needed to begin global coverage of the service. Service can begin with the launch of a single satellite, although to ensure service reliability and shorter delivery times multiple satellites are envisioned. The system can grow incrementally as demand grows with the addition of new satellites to the fleet. Adding to the fleet enhances overall system capacity, reduces delivery time, and adds system redundancy. This is in contrast to many other satellite communications systems where a large number of satellites have to be completed and on orbit before any users can be supported, especially when the source and destinations are widely separated.

While the embodiment does not require coordination or communication between satellites, such additions can be deployed and provide an enhancement to data delivery times where that feature is important.

2. Satellite Payload

Figure 4:
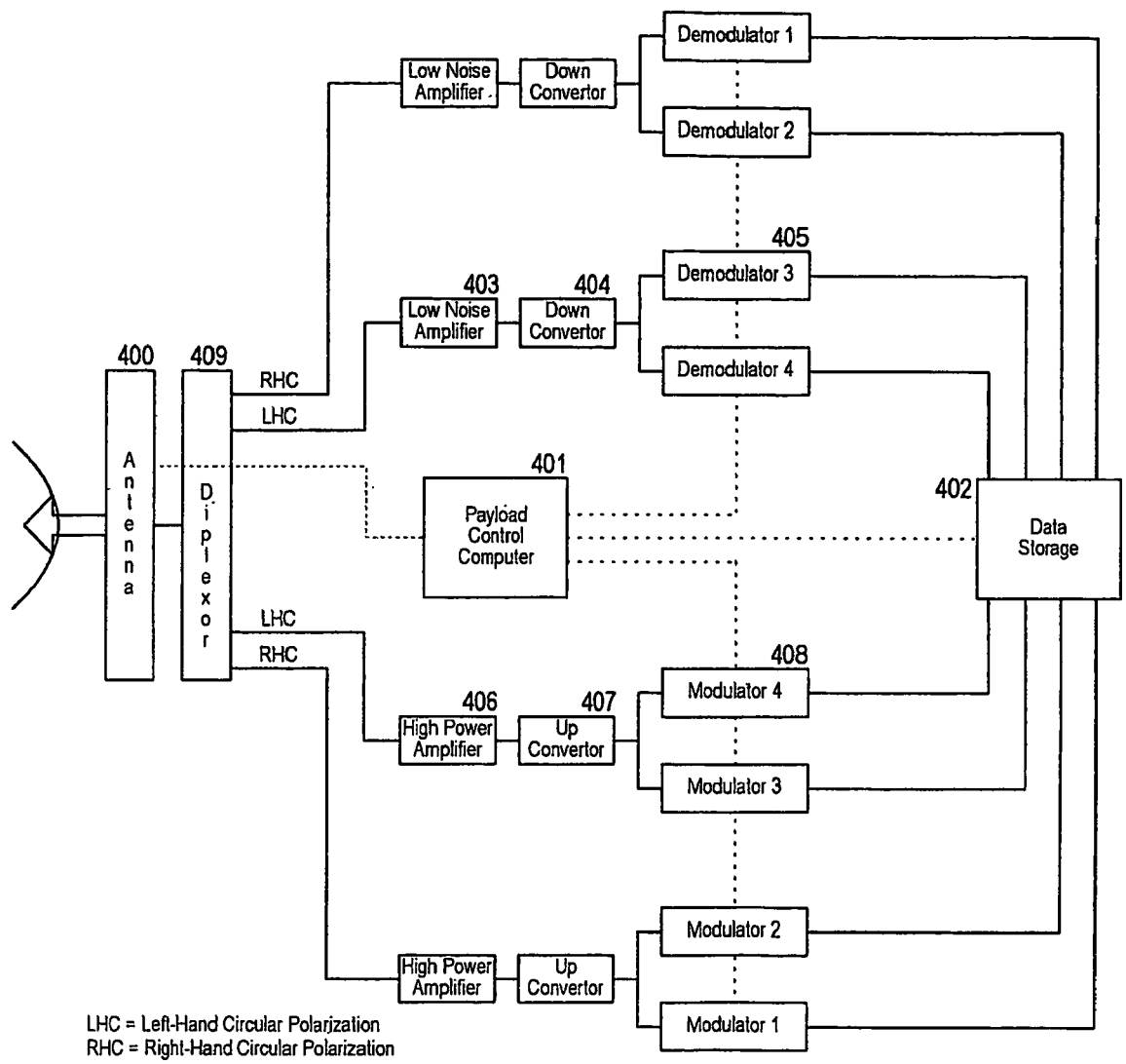
FIG. 4: A simplified system payload block diagram showing technical elements for the embodiment of the invention.

A system communications payload 312 provides the two-way directional data communications capability with ground terminals. The payload consists of these major parts: radio frequency (RF)/digital equipment 400 and 403 through 409, a data storage unit 402, and a payload controller 401. A simplified block diagram of payload components is shown in FIG. 4 (redundancy and switching is not shown).

The payload control computer 401 interfaces with the TT&C relay to control the operation of the payload including antenna pointing as required. The RF/digital equipment is responsible for the high rate and high quality transmission and reception and the associated analog-digital conversions. The RF/digital equipment primarily consists of a transmit/receive antenna 400 which can be pointed, a diplexor 409 that allows simultaneous connection of uplink LNA 403 and down link HPA 406 components, a set of high speed modems constructed from high rate modulators 408/demodulators 405, associated up-converters 407/down-converters 404 and various filters and switches. To provide the overall capacity required for the end user bulk data store and forward needs, the total data transmit or receive rate is at least 1.2 gigabits per second. To facilitate this high data rate the data uplink and downlink is operated in the Ka-band, where sufficient spectrum is available. The total required data rate is achieved through the aggregate use of multiple lower rate channels (320 megabits per second or greater). Both right-hand (RHC) and left-hand circular (LHC) polarizations and frequency diversity are used (with two channels per polarization), and each channel is handled by a separate modem. The channel data rate used is restricted by the data rate limit of modulators and demodulators that are currently and affordably available or that could be developed with low risk in the near term. However, the availability of very much higher data rate modulators and demodulators is likely to occur in the future, permitting an embodiment with fewer channels or operating at even higher data rates. The data link method is described in more detail below.

Usage of other frequency bands are also suitable, provided that enough spectrum is available and licenses may be obtained, even including optical communications in substitution for RF.

The data storage unit is a very high capacity, but low mass and power efficient space qualified component. The unit allows each of the small-satellites to store over 6 terabits of data. The depicted embodiment of the data storage unit may be based on a redundant array of independent disks (RAID), or may be based on solid state data storage technology. Other data storage media are also possible. The data storage method is described in more detail below.

The payload has several modes, reflecting the fact that the payload may operate on a duty cycle basis. These modes include a low power mode for periods of inactivity, a pre-operation mode to ready the payload to enter one of the operational modes by warming up various components, two operational modes, and a safety mode that ensures the payload poses no threat to the survival of the satellite. The two operational modes, which are mutually exclusive (although an alternate embodiment may permit simultaneous reception and transmission with single or multiple users within the beam footprint), are data packet receipt mode and data packet transmission mode. In data packet receipt mode the antenna is pointed to acquire a specified set of latitude and longitude coordinates that has been designated as a stored command, the communications link with the transmitting ground terminal is initialized, and the user data is uplinked into on-board data storage. In a similar manner, when in data packet transmission mode, the payload antenna is pointed to acquire a specified set of latitude and longitude coordinates, the communications link with the receiving ground terminal is initialized and the user data is downlinked from on-board data storage.

A beacon signal is sent in the reverse direction (i.e. opposite from the direction that is transmitting data packages) and is used to gate transmissions and optionally to control power and/or bandwidth. The beacon may actively measure the characteristics of the transmission path from all link loss sources.

3. Satellite Platform

Basic command and control functionality to operate and maintain each satellite 302 in the fleet is provided by a small-satellite platform 314. In particular the satellite platform provides support services to the communications payload.

High level functions performed by the satellite platform include providing an S-band interface to the ground (to Mission Control 306 via the TT&C relays 308), autonomous satellite maintenance such as attitude and orbit determination and control (using GPS as input data), power control, thermal control, and fault detection, isolation and recovery (FDIR), as well as providing housekeeping and performance telemetry. While S-band is a common TT&C frequency band others may be used as well.

The satellite platform may also store pointing commands and possesses the means to point the antenna toward the desired spot on the ground. Either body pointing, gimbaled or phased arrays techniques may be used depending on size, cost or agility factors.

4. Ground Terminals

Ground terminals 310 provides access for a given user to the system, and the service it provides. A feature of the invention is the capability to support 'remote' ground terminals. Remote ground terminals, either for land-based, vehicular, or marine applications, are located in isolated regions (i.e. with limited communications infrastructure) and are typically small, with antennas as small as approximately 1.2 meters in diameter.

Ground terminals provide the terrestrial end of the high rate Ka-band link with a satellite. (As used generally herein, the term "terrestrial" refers to not only land-based, but also ocean-based, lake-based, etc.) Ground terminals act as a data source (transmit) or a data sink (receive) for the user data files (i.e. point to point satellite data transfer). Ground terminals may be transmit only, receive only, or both transmit and receive—but on a half duplex basis. Independent of the high data rate Ka-band link to the satellites, the ground terminals interface to Service Control 304 through a low bandwidth connection, such as standard terrestrial lines or a narrow-band satellite link such as digital messaging over various satellite based phones or Inmarsat for marine applications.

The ground terminals communicate with Service Control using the equivalent of email messages. This low bandwidth link utilizes the connectivity provided by pre-existing local communications infrastructure, required by the user for other operational purposes. The ground terminals connect to the local communications infrastructure via a standard internet protocol (IP) based local area network (LAN). The low bandwidth connection to the ground terminals is used by the system to schedule and coordinate the service (i.e. data file pick-up and drop-off activities), provide service status to the users, and to coordinate and implement any data transmission that is requested to replace erroneous data blocks.

When the user wishes to transfer a file it is copied (automatically) to the originating ground terminal via a standard transfer protocol, such as FTP. The originating ground terminal frames and codes the data for transmission. The originating ground terminal makes a service request and Service Control 304 schedules the data uplink and downlink activities with the originating and destination ground terminal as well as a specific satellite (via Mission Control 306).

Once the data is received at the destination ground terminal the data blocks are decoded and correctable errors are fixed. Any data blocks containing errors that are uncorrectable through the decoding process are listed to Service Control 304. Service Control initiates an alternative data transfer of these listed bad data blocks between the originating and destination ground terminals via the low bandwidth link. Upon receipt of these new blocks the destination ground terminal replaces the former bad data blocks. The rebuilt data is then placed directly into a local data archive or information system to be accessed by the user. The bit error rate prior to this extra layer of correction is sufficiently robust using common FEC (Forward Error Correction) that such a low bandwidth link is quite adequate. Other encoding may be performed to facilitate error detection and correction/recovery at the given receiver (e.g., satellite, ground terminal or ultimate target computer to receive the data file). If due to anomalous conditions the resend is excessive large the system may maintain the data in storage until verification is acknowledged, and the data may be retransmitted on the next suitable satellite pass.

The ground terminal also employs a beacon signal that operates in the opposite path direction to the data communication (i.e. opposite from the direction that is transmitting data packages). The beacon is used to measure link quality and based upon that direct measurement the satellite or ground terminal may gate its transmissions or adjust power and/or bandwidth to maximize transfer effectiveness.

The planning and tasking method and the data error correction method are described in more detail below.

As a means to further reduce delay in data delivery, or potentially reduce cost, the data may be relayed via intersatellite links to a second satellite or via a ground relay. The ground relay would consist of a ground station that may be located where it can readily connect to other high bandwidth services or terrestrial links such as fibre systems. In this way the data may be delivered on an earlier satellite orbit to a location that can easily pass it on to the destination. Reciprocally, this same relay embodiment may be used to source the data to the satellite for transmission to the remote terminal.

The terminals and following system elements may be implemented in or on any suitable computing platform or environment. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer" and "terminal" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

5. Service Control

Service Control 304 is a software module that provides a centralized planning function for the system, coordinating on a pre-determined basis the actions of all ground terminals and satellites and managing resources. All data movement related activities of the satellite fleet and of the ground terminals are scheduled, tasked and monitored by Service Control. Service Control 304 tracks all user data in the system, coordinating any corrective measures necessary to ensure data quality is maintained in the end-to-end transmission of the user data. In particular the functionality provided by Service Control includes interfacing to the ground terminals 310, scheduling service, managing workflow, interfacing with Mission Control (coordinate command and control passes), tasking satellite payloads (via Mission Control), coordinating data block correction, and monitoring and maintaining ground terminal network state of health.

Optionally the satellite 302 may contain a narrow band receiver or transceiver that can receive a request directly from a user transmitter/transceiver for data pick up and subsequent delivery. The satellite will examine the new request and determine if it is a valid user, and if in servicing the request there is a violation of any safety or service criteria. Examples of these criteria include: on-board power management, thermal loading, interference, adequate on-board storage reserves, slew rate of antennas, view angle of the ground stations, time to next pass, etc.

6. Mission Control

Centralized satellite fleet control and tasking functions are provided by Mission Control 306. Mission Control is responsible for satellite monitoring, maintenance and for translation and uplinking the satellite activities to be executed in support of data movement. In particular Mission Control functionality includes generating satellite command files, scheduling and tasking TT&C relay passes, tasking the satellite fleet (via the TT&C relays 308), processing satellite telemetry, verifying definitive orbits, generating predicted orbit data, and monitoring and maintaining satellite fleet state of health.

7. TT&C Relays

A set of telemetry, tracking and command (TT&C) relays 308 provide an S-band or other suitable TT&C frequency interface between Mission Control and the satellite fleet. TT&C relays are programmed and tasked by Mission Control to carry out command and control passes with satellites on a pre-determined schedule. The TT&C relays uplink a command file to a satellite and downlink telemetry, to be forwarded to Mission Control. These relays are considered part of Mission Control, although they may be external to the centralized Mission Control function. They exist to enable frequent communications with the satellite for safe monitoring and control, but also to upload current schedule information for data pick-up and delivery events. Typically for NGSO systems such relays are at high latitudes that have line of sight coverage at some point during most of the orbits.

The relay consists of a computer connected via reliable telecommunications to mission control, and which is connected to a transceiver and steerable antenna system. The antenna tracks the satellite and establishes reliable two way communications when the satellite is in view. During such times the relay 308 uploads new data including commands and software, and receives telemetry and other data from the satellite, which is transferred to mission control.

In a similar fashion to the incremental growth of the satellite fleet described, the system can be managed with only one TT&C relay, with the addition as needed of other TT&C relays reducing the time for the satellites to be tasked and increasing system reliability.

8. End-to-end Data Flow Method

As illustrated in FIG. 5, an end-to-end data flow method 500 is used by the system 300 to sequentially service users, by coordinating and transferring user data, as scheduled by the centralized planning function (i.e. Service Control 304). This end-to-end method is supported by a number of lower level methods, described in more detail herein, including:

planning and tasking method;
data link method;
data storage method;
rain fade method;
data error correction method; and
interference avoidance method.

To initiate the end-to-end data flow method, the user copies or transmits the data file to local storage at the source ground terminal 310, making it available to the system (step 501). The activities required by the system to transfer the data file are then planned by Service Control 304 and the appropriate components of the system are tasked (step 502). The data file is broken into data blocks by the ground terminal 310 and formatted (i.e. data is framed and FEC encoded using well known techniques such as Reed-Solomon coding) for transfer (step 503).

At the beginning of a data pick-up pass (step 504) the boresight of the payload antenna on the satellite 302 is directed to acquire a specified latitude/longitude point and initializes a communications link with the transmitting ground terminal 310. Uplink communication initialization includes the ground terminal 310 transmitting a pattern at the start of an uplink to allow the satellite demodulators to establish synchronization (lock up). The system allows a few seconds for initialization and then the satellite 302 begins recording the uplink and the ground terminal 310 begins transmitting the user data (step 509). In parallel the ground terminal monitors the beacon level transmitted by the payload 312 of the satellite 302 (step 505).

For uplink, in the case that rain fade is significant and the beacon level drops below an operational threshold, the ground terminal 310 ceases transmission of the user data, instead transmitting fill data (step 506) in its place. The ground terminal continues to monitor the beacon level (step 507). Once the beacon level returns to an operational level the ground terminal commences transmission of user data, starting with on the order of the last few seconds of data before the beacon drop-out (step 508) in order or ensure continuity of data. Overlapping (i.e. duplicate) data blocks are identified in post-processing and discarded at the destination ground terminal 310. The continuous transmission even of fill data can be important for proper operation of the high speed modems.

The data is stored on-board the payload 312 as the orbiting satellite 302 is in transit (step 510), before the next scheduled activity. The presented embodiment does not perform any decoding or encoding on-board the satellite, however, the data is reconstituted in that the data is recovered as bits which are stored and later remodulated for retransmission. (Under alternative embodiments, the satellite may perform some or significant signal processing or data analysis/recovery.)

In a reciprocal fashion, at the beginning of a data delivery pass (step 511) the payload antenna boresight is directed to acquire a specified latitude/longitude point and initializes the communications link with the receiving ground terminal. Downlink communication initialization includes the satellite 302 transmitting a pattern at the start of a downlink to allow demodulators at the ground terminal 310 to synchronize (lock up). The system allows a few seconds for initialization and then the ground terminal begins recording the downlink and the satellite begins transmitting the specified user data from on-board storage (step 516). In parallel the satellite monitors the beacon level transmitted by the ground terminal (step 512).

For downlink, in the case that rain fade or other degradation is significant and the beacon level drops below an operational threshold, the satellite 302 ceases transmission of the user data, instead transmitting fill data (step 513). The satellite continues to monitor the beacon level (step 514). Once the beacon level returns to an operational level the satellite commences transmission of user data, starting with on the order of the last few seconds of data before the beacon drop-out (step 515). Again, this ensures continuity of data.

Once the user data is received from the satellite 302 at the destination ground terminal 310, it is decoded, any correctable errors are fixed, and any transmission errors that are identified as uncorrectable through the FEC (Reed-Solomon or other common FEC coding scheme) decoding process are listed for Service Control 304 (step 517). The system coordinates the re-sending of the very few specific data blocks containing uncorrectable errors through an alternate low bandwidth communication link (step 518). The destination ground terminal then corrects the errors by replacing the bad data blocks (step 519) and makes the data available to the user, either locally or via high-speed networks (step 520). The overall effect of cascading these techniques results in extremely low bit error rates (e.g. ~10 E-16).

For the uplink or downlink, in the case that interference avoidance is required (not shown), the pass may be broken up into two separate segments, with a gap (i.e. exclusion zone) as required during which all transmissions are turned off.

B. METHODS/SUBROUTINES

1. Planning and Tasking Method

In this embodiment the coordination of the system is performed by a centralized ground-based planning function (i.e. Service Control 304). This coordination includes deciding which user to serve, and when, as well as deciding on how to utilize system resources to best provide this service. The satellites do not have to make an autonomous decision, they only need to follow the specified actions that have been uplinked from the ground. In an alternate embodiment the satellite may accept some requests from the ground users directly and integrate them with the instructions from the ground, but with restrictions that these requests must not conflict with ground instructions, priorities, or satellite operational limits (e.g., orbit average power battery restrictions or memory capacity limits).

System control software manages resources, such as satellite on-board memory and power usage. The management of the satellite on-board file system is also performed on the ground, as part of resource planning. It is noted that alternatively file system management could be done on-board the satellite 302 itself. Conflicting service demands are resolved and large data packages are broken up into smaller ones to approach an optimized schedule. Schedule interruptions introduced to manage interference issues with other systems (e.g., geostationary arc) are also planned. The centralized planning function pre-determines the required schedule of interactions between the satellite fleet and the ground terminals.

The satellites and ground terminals are then periodically tasked based on the pre-determined schedule of interactions, which simplifies the overall system design. Specific tasks are uplinked to the satellites using a network of telemetry, tracking and command (TT&C) relays 308, via Mission Control 306. The ground terminal communicate with the centralized planning function, using the equivalent of email messages, to coordinate the scheduled activities including the data pick-up and drop-off passes and any low bandwidth link for error correction.

This planning and tasking method is low risk since the system only has to support a few large users versus more usual satellite communications systems that try to serve many very small and diverse users. Allocation of large file pick-up and drop-off service to users is analogous to the allocation schemes used by earth observation satellites—this embodiment does not have to perform complicated dynamic on-demand allocation of the satellite resource usually seen in satellite communication systems. It is noted that other planning and tasking methods could also be used.

The system, through its focus on files transfers, avoids signal latency issues usually found with satellite communications systems that try to support applications, such as phone conversations, and are not applicable.

The system may also ensure that satellite ephemeris and orbital elements are managed by the ground control system and made available to the antenna tracking algorithms so that the open loop tracking method is always as accurate as necessary.

2. Data Link Method

The system may operate the high-speed space to ground data link in the Ka spectrum band, within specific frequency allocations for both the downlink and the uplink. Alternatively, other bands or optical links are applicable that provide enough fractional bandwidth for the necessary data rates and that they may be licensed for such purposes.

A single-user access scheme is employed by the system, allocating the full satellite link capacity to a given user, one at a time (although in alternative embodiments, the satellite may handle several concurrent users). This also allows for simple very high data rate channelization of the bandwidth. Other satellite communications systems typically employ a multi-user access scheme, with tens or hundreds of individual lower rate channels. Additionally the system operates as half duplex, so there is no simultaneous data transmit and receive, however a full duplex system could be used.

For the depicted embodiment the aggregate bandwidth, on the order of 1.2 gigabits per second, is provided by four asynchronous channels, although higher rates may evolve as technology and user requirements grow over time. Specifically both right-hand and left-hand circular polarizations and frequency diversity are used with each polarization split into two channels. Each of these four channels is handled by a separate modem (see FIG. 4). It is noted that alternate channelization schemes can achieve an equivalent bandwidth, such as fewer but higher rate channels. However, the depicted embodiment reduces cost and technical risk because of the present availability of these space qualified modulators and particularly these demodulators.

The uplink and downlink signal modulation may be QPSK, or offset-QPSK, with the data differentially encoded by source ground terminals to allow I/Q and polarity ambiguities to be resolved at the receiving (destination) ground terminal. No added coding nor decoding of the data is performed by the satellite, other than that required to convert the demodulator output to data bits for storage and the reciprocal process for remodulation. This data reconstitution avoids the increase in noise level that arises from "bent pipe" analog transponders, but requires no intelligence on board the satellite to discern the nature of the data that is being transferred for the user. It is noted that other signal modulation and data encoding schemes are also feasible.

The system does not require a data transfer protocol and therefore the satellite manages the bit stream at the link layer. Since the system supports non-real-time applications, it avoids the usual satellite real-time communications need for a data transfer protocol, with corresponding overhead, and the associated return channel. This means that the primary communications channel can be utilized at 100% of designed capacity.

3. Rain Fade Method

A beacon signal is included in the system design for supporting closed loop antenna tracking, which is especially useful for ship borne ground terminals. However, as a key dual benefit, a method for eliminating the chance of sending data during high rain fade or other disadvantaged conditions takes advantage of the presence of a beacon signal. It does so without any need for two way communications with the source of transmissions. This is an important feature of the invention since at Ka-band (and many other very high RF and optical communications bands) the rain fade of the signal can be significant. The monitored beacon signal level is used for flow control of the data transmission. The beacon signal level may also be used to control transmit power to allow reduction of the effective isotropic radiated power (EIRP) with a good link to preserve battery capacity. Alternatively, the bandwidth may be adjusted to focus all the amplifier (HPA) power under marginal link condition The beacon may be a narrow-band signal that is pseudo-random (PN) code modulated to spread the spectrum within the frequency spectrum allocated for data transmission on the uplink or downlink. An alternate embodiment of the beacon may be an un-modulated narrow-band signal within the allocated frequency spectrum. The received beacon level may be low pass filtered before using it to determine the path condition.

The transmitting end of the link monitors the strength of the beacon signal, and transmits dummy fill data when the beacon signal strength is below the operational threshold, a minimum $E_b/N_0$ or C/N. Each channel may have a separate estimate for this beacon signal level measurement. The process employs hysterisis between the poor and the good received beacon level thresholds to prevent excessive switching between the good and poor levels. Beacon reception is simultaneous with data transmission, and beacon transmission is simultaneous with data reception. The beacon signal generation and monitoring may be performed without adding separate beacon-specific transmit/receive chains. The use of a data transfer protocol to ensure data fidelity, instead of using the described rain fade method, would reduce the system efficiency.

Just prior and during the data uplink from a ground terminal 310, the payload 312 can downlink the beacon. This beacon can be monitored by the ground terminal 310 to facilitate tracking and to determine path conditions. If the path conditions are too poor to permit low error transmission of data to the satellite, the ground terminal can stop transmitting data until such time as the beacon signal strength improves, and can instead transmit dummy fill data. This process is reversed for the case where the satellite 302 is downlinking data to a ground terminal. The ground terminal may uplink the beacon for the satellite to monitor path conditions and for payload antenna tracking. If the path conditions are too poor to permit low error transmission of data to the ground terminal, the satellite can stop transmitting data, and can instead transmit dummy fill data, until such time as the beacon signal strength improves.

4. Data Storage Method

The depicted embodiment of the invention includes a high capacity data storage method as a part of the store and forward operation, with a total storage capacity currently sized at about 6 terabits. The data storage embodiment may have a separate data storage unit for each of the four data channels, each channel handled asynchronously and in parallel. The data storage units may be a redundant array of independent disks (RAID). This is basically a small coordinated group of commercially available, space qualified, high capacity computer hard drives that are mounted so as not to introduce unwanted angular momentum or disturbance torques. However, other data storage media, including solid state storage technology, could also be used as an alternative embodiment, especially as solid state memory device densities continues to rise rapidly.

The coded and framed bit stream is inputted in raw form into data storage, and transmitted in raw form from data storage, so no special processing or switching is required on-board the satellite 302, which simplifies the payload design. The data storage units are designed for high speed read and write, including random addressing and accessibility, with data handled in blocks at a resolution currently of approximately 4 megabytes. File management of the on-board data blocks is performed on the ground by Service Control 304 through the upload of pre-determined actions, also simplifying the payload design.

The data storage units are designed to operate in a space environment, with low power consumption, and a reasonable size and mass compared to other data storage options. The data storage units are also designed for high reliability, to facilitate data integrity and satellite lifetime.

The storage may have a high speed input/output data path that matches the modem data rates, and the ability to randomly access each user's data for independent transmission. It is recognized that other variations on this embodiment for data storage could be used to meet the required high capacity and high speed requirements.

5. Data Error Correction Method

The data link method will inevitably introduce errors into the user data, with these errors tending to be a mixture of random bit errors and burst errors. To ensure data integrity through virtually error-free transmission, with a bit error rate on the order of $10^{-16}$ (approximately equivalent to one bit error per 10,000 delivered 100 gigabyte files), the system uses a combination of the following techniques to augment the data link:

Data Coding Method;
Data Re-Retransmission Method (few bad blocks); and
Data Re-Transmission (major data block loss) Method.

a. Data Coding Method

A technique of the invention for the detection and correction of transmission errors is Forward Error Correction (e.g., Reed-Solomon) coding of the data. The embodiment of the system uses an interleaved Reed-Solomon forward error correction method to correct the majority of transmission bit errors and detect uncorrectable errors. No other encoding or decoding is performed by the satellites, which adds slightly to the data overhead stored on-board, but also greatly reduces the complexity of the satellite payload.

This data coding technique is illustrated in FIG. 6. User data may be transmitted via the satellite in data blocks. The size of these data blocks may be selected but is shown as 1024 bytes of user data plus approximately 17% overhead for framing and error correction encoding. The transmitted data blocks may be composed of five interleaved Reed Solomon error correction blocks, with a Reed Solomon (255,223) code used. It is noted that other encoding may be used under alternative embodiments. The Reed Solomon encoding is performed by the originating ground terminal 310. Upon receipt of the user data the destination ground terminal decodes the data, checks for errors and automatically corrects any identified errors, when possible, using the Reed Solomon encoded information. Errors detected through the Reed-Solomon decoding process that are not directly correctable are listed to Service Control. This technique produces BER levels that are approximately 10 E-8 alone.

b. Data Re-Transmission Method (Few Bad Blocks)

The second technique for data error correction is for the destination ground terminal to use a low speed channel or alternate satellite or terrestrial link to retrieve new data blocks that had contained uncorrectable errors from the originating ground terminal. Data blocks received with uncorrectable errors at the destination ground terminal are identified through the Reed-Solomon decoding process and a list of these bad blocks is provided to Service Control 304. Service Control then coordinates with the originating ground terminal 310, using standard email type messages, to send new data blocks for the destination ground terminal to replace the corrupted data blocks. This technique is illustrated in FIG. 6.

This low speed link may be a dial-up, internet, or modem connection via standard low-bandwidth communication mechanisms already in place between the receiving and transmitting ground terminals (e.g., terrestrial lines or Inmarsat). This conventional low speed link is independent of the Cascade™ satellite or fleet of satellites.

The minimum recommended speed of this connection to support the system is 9600 bits per second. The data recovery method is feasible since the number of uncorrectable errors will be very small for data files under the above embodiment, typically requiring no more than a few minutes at this 9600 bits per second data rate to obtain the required data blocks from the originating ground terminal. In an extreme case the number of data blocks requested by this method may be automatically limited, based on the actual connection data rates, to be less than the cost of a the third method below for data recovery.

c. Data Re-Transmission Method (Major Data Loss)

As a third error correction technique, if there are a large number of data blocks with uncorrectable errors (rare), the data blocks are re-transmitted either directly from the data storage on-board the satellite or from the originating ground terminal via the satellite fleet. The destination ground terminal would then replace the bad data blocks with the new data blocks in the same way as for the prior data recovery method. The use of this data re-transmission method, as opposed to the previous method, is decided and coordinated by Service Control. The data re-transmission technique is illustrated in FIG. 6.

6. Interference Avoidance Method

Since all actions of the system are ultimately controlled on a pre-determined basis by Service Control and since the applications are all non-real-time, the system can easily avoid transmitting along pre-designated vectors, such as the geostationary arc, or ones that would intersect other non-geosynchronous orbit (NGSO) systems.

The satellite and ground terminal may perform data transfer passes, as previously described, until a pre-determined service null vector is reached. At that point all transmissions by the satellite and the ground terminal are terminated. Once the system has passed such a service null vector, typically a small portion of a given data transfer pass with the satellite, the transmission can re-commence. All these interference avoidance activities are pre-determined and scheduled by Service Control as part of normal system tasking. Therefore, the embodiment of this system is inherently interference friendly and easily coordinated with other systems using the same frequencies.

To minimize the need for the satellite to carry a complex and changing tabulation of ephemeris data and compute the blanking intervals itself, the management of transmission blanking is calculated on the ground by mission control and uplinked via the TT&C relays to the satellite as command data.

C. CONCLUSION

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the data transfer system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a system for providing communication services between geographically dispersed source and destination terminals, an apparatus comprising:
   at least one airborne or spaceborne and movable wireless communications device, wherein the wireless communications device is configured to store and forward large data files of at least an aggregated 10 gigabytes, and includes:
      a wireless transceiver for communicating with the source and destination terminals over at least one high bandwidth channel,
      mass data storage configured to store the large data files for a predetermined period of time, wherein the predetermined period of time is greater than two minutes, and
      at least one processor coupled among the wireless transceiver and the mass data storage;
   wherein the processor, via the wireless transceiver, is configured to
      control receipt of at least one large data file, from the source terminal, for storage in the mass data storage, and
      after the airborne or spacebourne wireless communications device travels near to the destination terminal, control transmit of the large data file to the destination terminal; and
   wherein the processor is configured to:
      receive at a first time a control signal from a terrestrial station, wherein the control signal schedules a time and provides an originating geographic location to receive the large data file, wherein the originating geographic location is associated with the source terminal,
      receive, at a second time and from the source terminal, the large data file when the airborne or spacebourne wireless communications device travels to the originating geographic location, wherein the second time is after the first time, and
      transmit at a third time the large data file to the destination terminal, wherein the third time is at least two minutes after the second time, and wherein the destination terminal is geographically remote from the originating geographic location.

2. The apparatus of claim 1 wherein the wireless communications device is a satellite, and the communication system employs a constellation of multiple orbiting satellites.

3. The apparatus of claim 1 wherein the wireless communications device is a satellite in a non-geostationary orbit.

4. The apparatus of claim 1 wherein the wireless transceiver employs radio frequency (RF) or optical communication techniques.

5. The apparatus of claim 1, further comprising a low bandwidth transceiver coupled with the processor for communicating over a low bandwidth channel, and wherein the processor is further configured to:
   receive scheduling commands from a land- or sea-based mission control facility over the low bandwidth channel; and
   schedule at least transmission of the large data files based on the scheduling commands.

6. The apparatus of claim 1 wherein the high bandwidth channel includes one or more channels that in aggregate have at least a 200 Mb/s bandwidth.

7. The apparatus of claim 1 wherein the processor is further configured to transmit the large data file to, or receive the large data file from, another airborne or spaceborne and movable wireless communications device.

8. The apparatus of claim 1 wherein the processor is further configured to:
   autonomously receive a request to accept a new large data file from a new terminal, and
   receive the new large data file if the processor autonomously determines that the new large data file may be stored in the mass data storage and be safely transmitted to another terminal.

9. The apparatus of claim 1 wherein the processor is configured to facilitate processing of the large data file via transparent relay mode communication.

10. The apparatus of claim 1 wherein the wireless transceiver operates via optical or radio frequency transmissions.

11. A computer system, the computer system comprising:
a terrestrial server computer at a terrestrial destination location and configured to receive a data signal, wherein the data signal represents at least a portion of a large data file, wherein the large data file is of at least an aggregated 10 gigabytes,
wherein the data signal is transmitted by a airborne or spaceborne and movable wireless communications device configured to (a) wirelessly receive, over at least one high bandwidth communications channel, the large data file from a land- or sea-based source terminal at an originating geographic location, (b) store the large data file for a predetermined period of time greater than two minutes, and (c) transmit the signal and the large data file after the airborne or spaceborne wireless communications device travels from the land- or sea-based source to the terrestrial destination location; and
wherein the data signal includes coding for error correction of the large data file;
wherein the airborne or spaceborne and movable wireless communications device—(a) receives at a first time a control signal scheduling a time and providing the originating geographic location to receive the large data file, (b) receives at a second time the large data file when the airborne or spacebourne wireless communications device travels to the originating geographic location, wherein the second time is after the first time, and (c) transmits at a third time the large data file to the terrestrial server computer at the destination location;
wherein the third time is at least two minutes after the second time, and
wherein the destination location is geographically remote from the originating geographic location.

12. The computer system of claim 11 wherein the large data file is divided into smaller groups of data, and wherein the coding or the dividing is adjusted based on a quality of the high bandwidth communications channel.

13. The computer system of claim 11 wherein the data signal includes fill blocks instead of portions of the large data file when the high bandwidth communications channel is unacceptable.

14. The computer system of claim 11 wherein the large data file is block coded.

15. The computer system of claim 11 wherein the coding includes forward error correcting the large data file.

16. The computer system of claim 11 wherein coding includes encrypting the large data file.

17. An apparatus for use with an airborne or spaceborne and movable wireless communications device, the apparatus comprising:
a terrestrial-based server computer configured to provide control signals to the airborne or spaceborne and movable wireless communications device, wherein the control signals instruct the airborne or spaceborne and movable wireless communications device to direct an antenna of the airborne or spaceborne and movable wireless communications device to receive data from a land- or sea-based source terminal, wherein the data represents at least a portion of a large data file, wherein the large data file is of at least a combined 10 gigabytes;
wherein the airborne or spaceborne and movable wireless communications device is configured to wirelessly receive, over at least one high bandwidth communications channel, the large data file from a land- or sea-based source terminal, and to store the large data file for a predetermined period of time greater than two minutes,
wherein the terrestrial-based server computer is further configured to provide control signals to direct the antenna of the airborne or spaceborne and movable wireless communications device to transmit the large data file after the airborne or spaceborne wireless communications device travels from the land- or sea-based source terminal to a terrestrial destination terminal, wherein the terrestrial destination terminal is geographically remote from the land- or sea-based source terminal
wherein the airborne or spaceborne and movable wireless communications device transmit the large data file after at least two minutes have passed since the airborne or spaceborne and movable wireless communications device received the large data file;
wherein the high bandwidth channel includes one or more channels that in aggregate have at least a 200 Mb/s bandwidth; and
wherein the information bearing signal, or the signal transmitted by the airborne or spaceborne and movable wireless communications device, includes coding for error correction of the large data file.

18. The apparatus of claim 17 wherein the large data file is block coded, and wherein the coding includes forward error correcting the large data file.

* * * * *

UNITED STATES PATENT AND TRADEMARK OFFICE
CERTIFICATE OF CORRECTION

PATENT NO. : 7,783,734 B2  
APPLICATION NO. : 10/530018  
DATED : August 24, 2010  
INVENTOR(S) : Gregory Giffin et al.

Page 1 of 1

It is certified that error appears in the above-identified patent and that said Letters Patent is hereby corrected as shown below:

In the Drawings:

On Sheet 6 of 6, figure 6, line 10, Delete "occurence" and insert -- occurrence --, therefor.

On Sheet 6 of 6, figure 6, line 10, Delete "occurence" and insert -- occurrence --, therefor.

In the Specifications:

In column 13, line 64, Delete "condition" and insert -- condition. --, therefor.

In column 14, line 11, Delete "hysterisis" and insert -- hysteresis --, therefor.

In the Claims:

In column 18, line 15, in claim 1, delete "spacebourne" and insert -- spaceborne --, therefor.

In column 18, line 27, in claim 1, delete "spacebourne" and insert -- spaceborne --, therefor.

In column 19, line 30, in claim 11, delete "spacebourne" and insert -- spaceborne --, therefor.

Signed and Sealed this  
Twenty-first Day of May, 2013

Teresa Stanek Rea  
*Acting Director of the United States Patent and Trademark Office*